Figure 1:
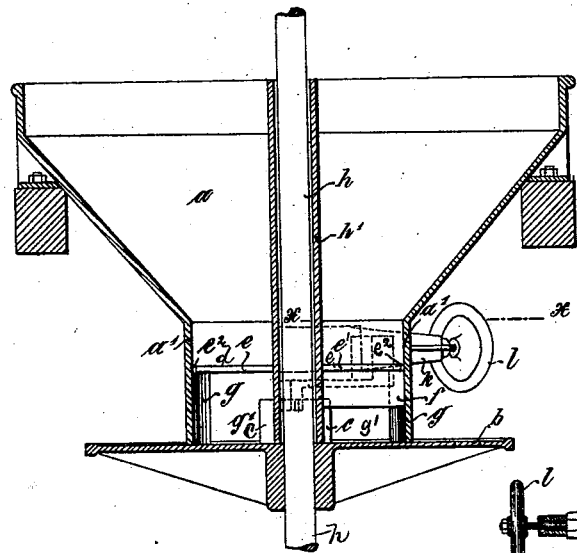

(No Model.) 2 Sheets—Sheet 1.

P. JOCHUM.
APPARATUS FOR REMOVING MEASURED QUANTITIES OF GRANULAR MATERIAL FROM RECEPTACLES.

No. 513,932. Patented Jan. 30, 1894.

Witnesses:
Walter E. Allen
Edward L. Knight

Inventor:
Paul Jochum
By Knight Bros.
Attorneys (No Model.) 2 Sheets—Sheet 2.

P. JOCHUM.
APPARATUS FOR REMOVING MEASURED QUANTITIES OF GRANULAR MATERIAL FROM RECEPTACLES.

No. 513,932. Patented Jan. 30, 1894.

Witnesses:
Walter E. Allen
Edward D. Knight

Inventor:
Paul Jochum.
By Knight Bros.
Attorneys.

UNITED STATES PATENT OFFICE.

PAUL JOCHUM, OF OTTWEILER, ASSIGNOR TO THE GRUSONWERK, OF MAGDEBURG, GERMANY.

APPARATUS FOR REMOVING MEASURED QUANTITIES OF GRANULAR MATERIAL FROM RECEPTACLES.

SPECIFICATION forming part of Letters Patent No. 513,932, dated January 30, 1894.

Application filed January 9, 1893. Serial No. 457,812. (No model.)

*To all whom it may concern:*

Be it known that I, PAUL JOCHUM, a subject of the King of Prussia, and a resident of Ottweiler, in the Kingdom of Prussia, German Empire, have invented certain new and useful Improvements in Apparatus for Manufacturing Artificial Stone, of which the following is a specification.

My invention relates to apparatus for manufacturing artificial stone which during the unit of time will remove from a receptacle filled with pulverulent or granular materials an accurately measured quantity of such materials. The said apparatus comprises a hopper, beneath the delivery opening of which, rotates a horizontal plate or table, from which the pulverulent, or granular materials falling thereon from the hopper, or a portion of said materials are scraped by means of a blade or metallic strip. If, as is the case with apparatus of this kind heretofore employed, the material is allowed to drop freely upon the rotating plate or table, the heap will assume a more or less pyramidal form, the edge of which according to the condition of the material will be inclined at a smaller or greater angle of slope, and the base of which will spread to a smaller or greater extent. Consequently under these circumstances the quantity which is scraped off during a revolution of the plate, can never be accurately determined. Moreover, with each material the angle of slope changes to no inconsiderable extent according to the moisture in the air, so that the quantity conveyed will also vary. This defect is remedied by the devices hereinafter described, which prevent the formation of the sloped edge by the fact that the material which drops from the hopper upon the plate rotating at a uniform velocity, is scraped from the plate only after it has passed full bore through an orifice of known sectional area. The quantity or bulk of the material scraped off in a given time is thus exactly equal to the sectional area of the said orifice multiplied by the distance that would be traversed in the time by the center of gravity of the orifice assuming that it were moving round with the rotating plate or table, and this quantity does not change if after leaving the orifice the stream of material falls to pieces.

Two forms of apparatus constructed according to this invention are represented in the drawings.

Figure 3:
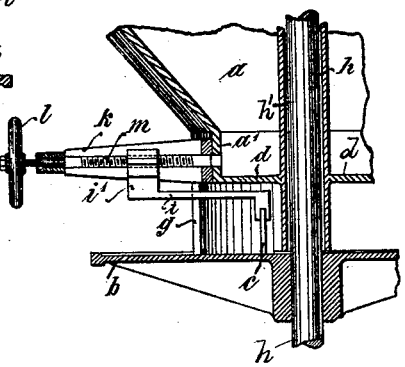
Figure 2:
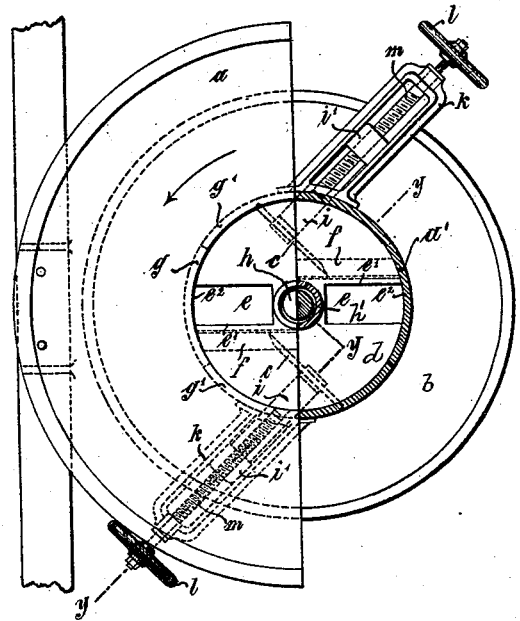
Figure 4:
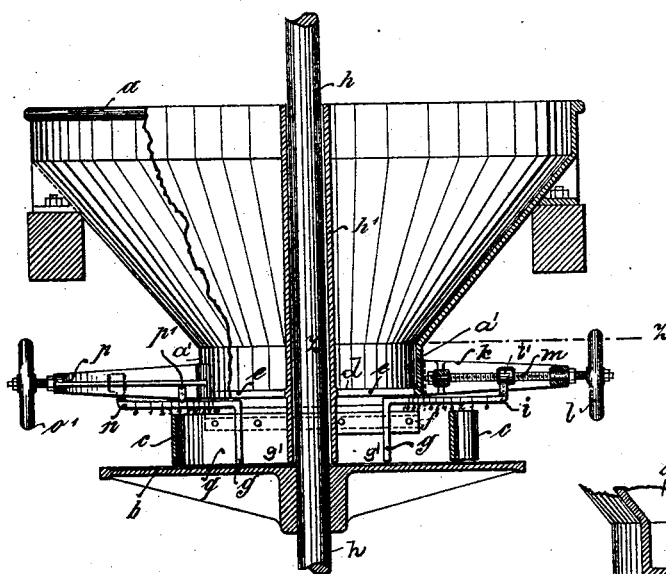
Figure 6:
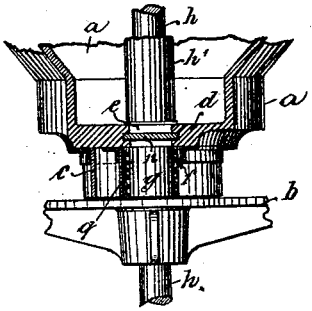
Figure 5:
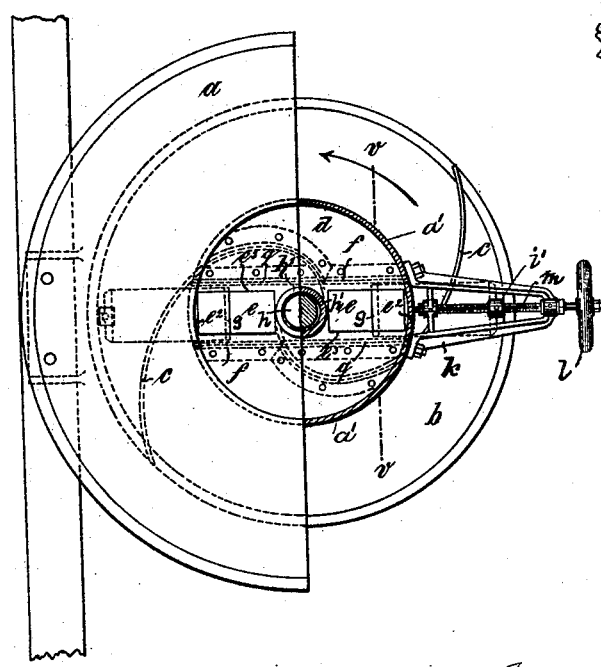

Figure 1 is a vertical section. Fig. 2 is a half plan and a half horizontal section on the line $x$—$x$ of Fig. 1, and Fig. 3 is a section on the line $y, y, y$, of Fig. 2 showing one form of the invention. Fig. 4 is a vertical section partly in elevation. Fig. 5 is a half plan and half horizontal section on the line $z, z$ of Fig. 4, and Fig. 6 is a section on the line $v, v$ of Fig. 5 showing a modification of the invention.

Like reference letters denote corresponding parts throughout the drawings.

Referring to Figs. 1 to 3 $a$ is the hopper; $b$ is the rotary plate or table; $c, c$ are the scrapers, there being two in this case, secured to the hopper. The hopper $a$ has a cylindrical neck $a'$ and is provided with a bottom plate $d$, Fig. 3, in which are formed one or more radial slots $e$, Figs. 1 and 2. To the lower face of the said plate $d$ at the edge $e'$ of each slot $e$ which is toward the direction of rotation of the plate (indicated by the arrow in Fig. 2) is fixed a strip or bar $f$. The lower edge of this strip or bar is situated at a definite known distance from the upper surface of the rotating table $b$, and determines the depth of the mass of materials which can be carried away by the said rotating table. At the outer edge $e^2$ of each slot $e$ the cylindrical contracted wall or neck $a'$ of the hopper $a$ is prolonged down to the table $b$ so producing cheeks $g$ between which are openings $g'$ to allow the materials to escape.

The table $b$ is caused to turn at a uniform velocity by the shafts $h$ to which the table is fixed. The thickness of the annular material carried away by the turning movement of the plate $b$ is determined by the lower edge of the strip $f'$, while the cheeks $g$ and the casing $h'$ around the shaft $h$ determine the outer and inner boundaries of the materials and prevent the formation of a slope in the radial direction.

Each blade $c$ can be adjusted parallel to itself in such a manner that its edge moves in a plane containing the axis of rotation of the table $b$. By this blade it is now possible to scrape off either the whole stream of material passing beneath the strip $f$ or only a portion of the stream according to requirements. That portion of the material which is scraped off, then slides along the surface of the blade and drops over the edge of the rotating table.

The scraping blade will evidently operate under the most favorable conditions if it does not change the direction of motion of the separated materials at all or but very slightly and gradually as there will not then be any stowing of the materials. This is effected in the construction shown, for in all positions of the blade $c$ its surface is tangential to the circle of division between the materials removed from the table and those left on the table so that the deflection of the material scraped off by it is practically nil.

The adjustment of the scraping blade $c$, as shown in Figs. 2 and 3, is effected by turning a hand wheel $l$ which is secured upon a screw $m$ adapted to turn in a support $k$. In its turning movement the screw displaces a nut $i'$, which is mounted on the screw $m$ and slides in the guide $k$ and is secured to or forms a part of the blade holder $i$. In consequence of this construction the scraper $c$ is always displaced in a direction at a right angle to its surface, so that, when once arranged tangentially to a circle struck with the axis of the shaft $h$ as center, it constitutes in every position the tangent of the circle at which the material is separated.

In the arrangement represented by Figs. 4 to 6, use is made, instead of the adjustable scraping blade, of unchangeable scraper (in combination with slots $e$), which are adapted to be regulated. This form of apparatus has also a hopper $a$ with a bottom plate $d$, through the radial slots $e$ of which the material to be measured falls upon the rotary table $b$ which then carries it below the strips $f$ to the curved scrapers $c$ fixed to the hopper $a$. The strip $f$ determines, as in the previously described apparatus, by the distance of its lower edge from the table $b$, the height of the layer lying upon the table and conducted to the scraper. The formation of the slope toward the periphery is in this apparatus prevented not by the fixed wall of the casing prolonged down to the table but by a wall $g$ adapted to be adjusted in the radial direction. This wall forms the downwardly bent part of a horizontal slide $i'$ which according as it is adjusted closes the slot $e$ more or less. The displacement of each of these slides $i'$ and also of the wall $g$ takes place by means of the hand wheel $l$ of a screw $m$ held in a support $k$ fixed to the hopper. By a pointer $p'$, Fig. 4, fixed upon the support $k$ the adjustment of the slide $i'$ is indicated in each case on a graduated scale provided thereon. A plate $q$ extending from the rear edge $e^3$ of each slot $e$ down to the table $b$ closes the space beneath and behind the slot and prevents on that side the formation of a slope. Owing to this arrangement the material falling through each of the slots $e$ on to the table $b$ is limited behind by the fixed plate $q$, exteriorly by the adjustable wall $g$ and interiorly by the fixed casing $h'$ of the shaft $h$. Accordingly also in this apparatus, when it is in operation, a continuous stream of material of rectangular transverse section passes through the opening below the plate $f'$, the quantity of the same passing in a given time being equal to the sectional area of the said opening multiplied by the distance that would be traversed in the time by the center of gravity of said area, were it supposed to be turning with the table.

By displacing the slide $n$ through the medium of the screw $m$, not only the sectional area $g'$ but also the distance of its center of gravity from the shaft can be changed during the operation. The displacement of the slide therefore effects a change in the volume of the material conducted away during a revolution of the plate, the pointer $p'$ indicating on the graduated scale the quantities of material conveyed for each position thereof per unit of time.

By increasing the number of slots $e$ and scrapers, the output of the machine may be correspondingly augmented.

What I do claim as my invention, and desire to secure by Letters Patent, is—

1. The combination of a rotating table, a hopper having a cylindrical contracted wall or neck formed with an opening for the passage of the material, a bottom plate, located within the wall or neck, having a radial slot, and a scraper; substantially as described.

2. The combination of a rotating table, a hopper having a cylindrical contracted wall or neck formed with an opening for the passage of the material, a bottom-plate, located within the wall or neck, having a radial slot, a strip depending from the bottom-plate, in front of the radial slot, and a scraper; substantially as described.

3. The combination of a rotating table, a hopper having a cylindrical contracted wall or neck formed with an opening for the passage of the material, a bottom-plate, located within the wall or neck, having a radial slot, a scraper and means for adjusting the scraper; substantially as described.

4. The combination of a shaft, the table fixed to the shaft, a hopper, formed with a wall or neck having a discharge opening, a bottom-plate, located within the wall or neck, having a radial slot, a strip depending from the bottom-plate in front of the radial slot, a sleeve surrounding the shaft, and a scraper; substantially as described.

5. The combination of a shaft, the table fixed to the shaft, a hopper formed with a wall or neck having a discharge-opening, a bottom plate, located within the wall or neck, having radial slot, strip secured to the bottom plate at the forward edge of the slot, a sleeve surrounding the shaft, a scraper secured within the wall or neck, and means for adjusting the scraper; substantially as described.

PAUL JOCHUM.

Witnesses:
 KARL E. DETZNER,
 EMIL KALLNECKER.